US008815051B2

(12) United States Patent
Basilio et al.

(10) Patent No.: US 8,815,051 B2
(45) Date of Patent: Aug. 26, 2014

(54) DEINKING OF WASTE PAPER

(75) Inventors: Cesar I. Basilio, Milledgeville, GA (US); Steven W. Sheppard, Sanderville, GA (US)

(73) Assignee: Thiele Kaolin Company, Sandersville, GA (US)

( * ) Notice: Subject to any disclaimer, the term of this patent is extended or adjusted under 35 U.S.C. 154(b) by 0 days.

(21) Appl. No.: 13/317,438

(22) Filed: Oct. 18, 2011

(65) Prior Publication Data

US 2012/0031573 A1 Feb. 9, 2012

Related U.S. Application Data

(63) Continuation-in-part of application No. 11/451,295, filed on Jun. 12, 2006, now Pat. No. 8,052,837.

(51) Int. Cl.
*D21B 1/08* (2006.01)

(52) U.S. Cl.
USPC ............... 162/4; 162/5; 162/109; 162/111; 162/158; 510/174; 510/504; 424/63; 424/590

(58) Field of Classification Search
USPC .......... 162/4, 5, 109, 111, 158; 510/174, 504; 424/63, 590
See application file for complete search history.

(56) References Cited

U.S. PATENT DOCUMENTS

| 1,421,195 | A | 6/1922 | Eyrich et al. |
| 3,764,460 | A | 10/1973 | Miyamoto et al. |
| 4,013,505 | A | 3/1977 | Balcar et al. |
| 4,360,439 | A | 11/1982 | Calmanti et al. |
| 4,421,195 | A | 12/1983 | Aiba |
| 4,483,741 | A | 11/1984 | Maloney et al. |
| 4,605,773 | A | 8/1986 | Maloney et al. |
| 4,964,949 | A | 10/1990 | Hamaguch et al. |
| 5,151,155 | A | 9/1992 | Cody et al. |
| 5,225,046 | A | 7/1993 | Borchardt |
| 5,227,019 | A | 7/1993 | Borchardt |
| 5,288,369 | A | 2/1994 | Ishibashi et al. |
| 5,308,448 | A | 5/1994 | Behler et al. |
| 5,336,372 | A | 8/1994 | Cody et al. |
| 5,362,363 | A | 11/1994 | Smolka et al. |
| 5,540,814 | A | 7/1996 | Curtis et al. |
| 5,725,730 | A | 3/1998 | Smolka et al. |
| 5,736,622 | A | 4/1998 | Wallberg et al. |
| 5,801,135 | A | 9/1998 | Miyauchi et al. |
| 5,882,476 | A | 3/1999 | Evans et al. |
| 6,103,687 | A | 8/2000 | Cody et al. |
| 6,136,994 | A | 10/2000 | Joseph et al. |
| 6,159,381 | A | 12/2000 | Bleakley et al. |
| 6,210,526 | B1 | 4/2001 | Pohlen |
| 6,251,220 | B1 | 6/2001 | Irinatsu et al. |
| 6,458,343 | B1 | 10/2002 | Zeman et al. |
| 7,862,685 | B2 | 1/2011 | Rosencrance et al. |
| 8,052,837 | B2 | 11/2011 | Basilio et al. |
| 2002/0066880 | A1 | 6/2002 | Robinson et al. |
| 2004/0065419 | A1 | 4/2004 | Lasmarias et al. |
| 2005/0098278 | A1 | 5/2005 | Rosencrance et al. |
| 2005/0133172 | A1 | 6/2005 | Robinson et al. |
| 2007/0158039 | A1 | 7/2007 | Rosencrance et al. |

FOREIGN PATENT DOCUMENTS

| JP | 61-266688 | 11/1986 |
| JP | 05-501285 | 3/1993 |
| JP | 05-501286 | 3/1993 |
| JP | 10-88489 | 4/1998 |
| JP | 11-240713 | 9/1999 |
| WO | WO 91/05905 | 5/1991 |

OTHER PUBLICATIONS

Murray, "Overview-clay mineral applications", Applied Clay Science, vol. 5, pp. 379-395 (1991).
Janczuk et al., "Influence of Exchangeable Cations . . .", Clays and Clay Minerals, vol. 37, No. 3, pp. 269-272 (1989).
Chiang et al., "Interfacial Properties of Lignite, Graphite, Kaolin, and Pyrite", ACS Fuels Symposium (Los Angeles), vol. 33, No. 4, pp. 777-788 (1988).
Willis et al., "Kaolin Flotation: Beyond the Classical", Advances in Flotation Technology, Society for Mining, Metallurgy, and Exploration, Inc., pp. 219-229 (1999).
Palomino et al., "Mixtures of Fine-Grained Minerals—Kaolinte and Carbonate Grains", Clays and Clay Minerals, vol. 56, No. 6, pp. 599-611 (2008).
Wang et al. "A Study of Carrier Flotation", International Symposium on Fine Particles Processing (Las Vegas), American Institute of Mining . . . , Inc., p. 1112-1128 (1980).
Smook, Handbook for Pulp & Paper Technologists; 2nd Edition; Angus Wilde Publications; 1992; p. 227.
"Interfacial Chemistry Aspects of De-inking Flotation of Mixed Office Paper";Drelich et al; Paper presented at Annual Meeting of the Society of Mining;Denver, CO;Feb. 26-28, 2001.
"Advances in Deinking Surfactant Chemistry for Onp/Omg Systems"; Horeck & Luo; Paper Age Magazine; Jul. 2001 issue.

*Primary Examiner* — Mark Halpern
(74) *Attorney, Agent, or Firm* — Baker, Donelson, Bearman, Caldwell & Berkowitz

(57) ABSTRACT

Deinking of waste paper is obtained with the use of a hydrophobic kaolin-based deinking composition. The hydrophobic kaolin-based deinking composition is produced by hydrophobizing the kaolin clay and then blending the hydrophobic kaolin-based particles with a deinking surfactant. Separation and removal of ink is achieved either by washing deinking, flotation deinking or combination of these methods.

2 Claims, No Drawings

DEINKING OF WASTE PAPER

REFERENCE TO RELATED APPLICATION

This application is a continuation-in-part of, and claims the benefit of, U.S. patent application Ser. No. 11/451,295, filed Jun. 12, 2006, now U.S. Pat. No. 8,052,837, issued Nov. 8, 2011.

TECHNICAL FIELD

The present invention relates to the deinking of waste paper. In a more specific aspect, this invention relates to the use of a hydrophobic kaolin-based deinking composition for the deinking of waste paper.

This invention also relates to a process for the deinking of waste paper.

BACKGROUND OF THE INVENTION

Deinked pulp has become a principal source of raw material for making paper in applications such as newsprint and tissue production. The deinking process has evolved throughout the years to provide for the removal of ink from recycled paper. In conventional paper recycling processes, deinking is carried out by converting the waste paper, such as old newspaper, old magazines and mixed office waste, to a pulp and then contacting the pulp with an alkali for pH modification and swelling of the fiber and a surfactant to stabilize the ink particles and reduce reattachment of the ink particles to the fiber. The ink particles and other impurities from the pulp fiber are then released and separated.

The current deinking processes employed in separating the ink from the fiber in waste paper include wash deinking, flotation deinking or a combination of these methods. Flotation deinking involves the interaction between the ink particles, air bubbles and the fibers. The ink particles, which are typically rendered hydrophobic by a deinking surfactant, attach to the air bubble surfaces and float upwards towards the top of the flotation device. Under typical conditions, the fiber will remain hydrophilic and will neither attach to the air bubbles nor float during the flotation process. In the case of wash deinking, the ink particles are kept well dispersed in the aqueous phase by surfactants. The ink particles are separated from the fibers by a repeated flow of water passing by the fibers through a screen. This wash deinking technology involves multiple dilution and thickening stages.

In deinking, the surfactants used are either fatty acids, synthetic surfactants such as alkoxylates or blends of these two surfactant types. Fatty acids are well known flotation agents used in both mineral and non-mineral applications. The use of synthetic surfactants such as alkylamine polyethers as deinking aids is described in U.S. Pat. Nos. 4,483,741 and 4,605,773. The use of a blend of fatty acid and alkylene oxide as a deinking agent is described in U.S. Pat. No. 4,964,949.

Another synthetic surfactant blend used in flotation deinking is a polyester obtained through the reaction between a polyalkylene glycol, carboxylic acid and/or anhydrides and saturated fatty acids, as described in U.S. Pat. No. 5,736,622.

U.S. Pat. Nos. 5,227,019; 5,225,046; 5,725,730 and 5,801,135 disclose the use of fatty acids with alkoxylated fatty alcohols in deinking. A flotation deinking method using an alkylene oxide, oil, fat and alcohol is described in U.S. Pat. No. 6,251,220.

U.S. Pat. Nos. 5,151,155 and 5,336,372 describe a deinking process wherein organically modified smectite clay is used.

U.S. Pat. No. 5,540,814 describes a method for removing ink and reducing stickies from waste paper by using cationic kaolin clay and a centrifugal cleaner.

Due to the limitations of these different deinking processes to separate the ink particles from the fiber obtained from waste paper, there is a need in the industry to develop a process that is more efficient and cost effective.

SUMMARY OF THE INVENTION

The present invention provides a hydrophobic kaolin-based deinking composition for use in the deinking of waste paper by wash deinking, flotation deinking or a combination of these methods.

The present invention also provides a process for the deinking of waste paper in which a hydrophobic kaolin-based deinking composition is used.

In the present invention, the increased interaction of the hydrophobic kaolin-based deinking composition with the ink particles results in an increased efficiency of the deinking process over other methods such as those methods utilizing deinking surfactants alone.

In the present invention, the hydrophobic kaolin-based deinking composition is prepared by dispersing the kaolin clay with chemical dispersants, treating the dispersed kaolin particles with hydrophobizing reagents, separating the hydrophobic particles from the non-hydrophobic particles and then adding a surfactant to the hydrophobic particles. Only the particles that are hydrophobic are used in this invention, unlike the prior art that uses the entire treated particles without regard to their surface property. The hydrophobic nature of these surface modified kaolin-based particles improves their attachment to the ink particles, resulting in improved separation of the ink particles from the fibers of the waste paper.

In addition, the ink particles in this invention are separated from the paper fibers using flotation deinking, wash deinking or a combination of these methods as compared to the prior art that relies on a gravity-type separator or a centrifugal device for separation.

The present invention also differs from the deinking process described in Irinatsu Japanese Patent Publication No. 10-088489, which uses hydrophobic fine particles such as calcium carbonate, talc, titanium oxide, zeolite, carbon powder, glass powder, oils, fats, solid fatty acid, emulsified fats and plastic. In the Irinatsu process, the hydrophobic fine particles are added during the period immediately prior to the start of flotation and before completion of the flotation process in the presence of an amino group compound. (The Irinatsu publication also lists kaolin as a hydrophobic fine particle. However, that listing is not accurate from a technical standpoint, as kaolin is naturally hydrophilic.)

For purposes of this application, the term "deinking" will be understood to refer to the treatment of waste paper so that the ink particles, or at least a substantial amount of the ink particles, are separated from the waste paper which can then be recycled for future use.

These and other objects, features and advantages of this invention will become apparent from the following detailed description.

DETAILED DESCRIPTION OF THE INVENTION

The present invention provides a deinking composition which comprises a hydrophobic kaolin-based deinking component and a surfactant. The present invention also provides a process for deinking waste paper in which this deinking composition is used.

In accordance with the present invention, the kaolin clay particles are first dispersed into a slurry form and then mixed with a hydrophobizing agent to modify the surface of the kaolin clay particles.

The hydrophobizing agents that may be used to prepare the surface-modified kaolin-based material include (but are not limited to) sulfhydryls, carboxylic acids, amines, oil, sulfonates, hydroxamates, fatty acids, siloxanes and blends of such agents. The hydrophobic kaolin-based particles are then concentrated and separated from the non-hydrophobic kaolin-based particles.

Methods of separating the hydrophobic particles include flotation and selective flocculation. In the case of flotation, the hydrophobic particles are transferred to a flotation cell and floated. The hydrophobic kaolin-based particles are then mixed with a deinking surfactant to produce a deinking composition that can be used in this invention as a deinking aid for improving the deinking process compared to a process using a deinking surfactant alone.

The basic steps in a deinking process involve the following: repulping the waste paper, coarse cleaning and screening, flotation and/or wash deinking, fine cleaning and screening and then bleaching.

In the repulping stage, the waste paper is usually treated in aqueous alkaline conditions with chemicals such as sodium hydroxide, sodium silicate and hydrogen peroxide. The repulping stage may also be conducted at neutral pH conditions by minimizing the addition of the alkali chemicals or using soda ash instead. The deinking composition of this invention is typically added at this stage, although this hydrophobic kaolin-based deinking composition may be added later just prior to the actual separation of the ink stage (i.e., washing or flotation). This step is followed by coarse cleaning or screening to remove the relatively coarse contaminants such as staples, plastic, etc. from the pulp. The pulp is then processed by well-known wash deinking, flotation deinking or a combination of these methods.

Crude kaolin clay generally contains kaolinite and other related hydrated aluminum silicate minerals as well as quartz, mica, titanium dioxide and iron oxide minerals.

To produce the surface modified kaolin clay deinking component of this invention, the starting crude kaolin clay is initially dispersed by blunging the clay with water in the presence of a dispersant at dosages ranging from about 1 to about 25 pounds per ton of dry solids. Effective dispersants include sodium silicate, sodium metasilicate, sodium hexametaphosphate, and sodium polyacrylate. The preferred dispersant for this invention is sodium silicate using dosages ranging from about 2 to about 16 pounds per ton of dry clay. The pH is adjusted to a range of about 5 to about 11, preferably about 7 to about 10, using a pH modifier such as sodium hydroxide, sodium carbonate or ammonium hydroxide.

The dispersed kaolin clay slurry is then mixed with a hydrophobizing reagent such as an alkyl hydroxamate, fatty acid, siloxane or a combination of such reagents. The amount of hydrophobizing reagent added to the dispersed kaolin slurry must be sufficient to hydrophobize the crude kaolin clay. The hydrophobizing reagents used are in the range of about 0.2 to about 10 pounds per ton of dry clay, preferably about 0.5 to about 5 pounds per ton.

After mixing with the hydrophobizing reagent, the kaolin slurry is then transferred to a froth flotation cell and, if necessary, diluted to a pulp density preferably within the range of about 15% to about 45% solids by weight. A frother, which is generally a heteropolar surface active organic reagent, may be added if necessary to stabilize the air bubbles. The amount of frother added depends on the type of frother used and the amount of the kaolin feed material. The frothers that can be used include alcohols, amines, alkoxy compounds and polyglycol compounds.

The preferred frothers for this invention are methyl isobutyl carbinol, ethyl hexanol, pine oil and polypropylene glycol. The frother dosage for effective flotation ranges from about 0.01 to about 2 pounds per ton of dry clay, preferably about 0.05 to about 1 pound per ton. The operation of the froth flotation machine is conducted in conventional fashion. After an appropriate period of operation, the hydrophobic kaolin clay particles are concentrated in the froth phase and collected.

In the production of the hydrophobic kaolin-based particles for the present invention, the froth flotation process can be conducted either in a mechanical or pneumatic machine. A typical pneumatic machine that can be used is a flotation column, while a typical mechanical machine is an impeller driven flotation machine. The hydrophobic material in this invention can also be produced by flotation through the use of other flotation processes such as dissolved air flotation, induced air flotation, bulk oil flotation, skin flotation or table flotation.

The hydroxamate agent used in the present invention is a hydroxamate compound, or a mixture of such compounds, having the general formula:

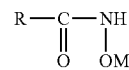

in which R is an alkyl, aryl or alkylaryl group having 4 to 28 carbon atoms, and M is hydrogen, an alkali metal or an alkaline earth metal.

Examples of suitable R groups include butyl, hexyl, octyl, dodecyl, lauryl, 2-ethylhexyl, oleyl, eicosyl, phenyl, tolyl, naphtyl and hexylphenyl.

Examples of suitable alkali metals are lithium, sodium and potassium.

Examples of suitable alkaline earth metals are magnesium, calcium and barium.

Examples of the hydroxamates which are useful in the process of the present invention include potassium butyl hydroxamate, potassium octyl hydroxamate, potassium lauryl hydroxamate, potassium 2-ethylhexyl hydroxamate, potassium oleyl hydroxamate, potassium eicosyl hydroxamate, potassium phenyl hydroxamate, potassium naphtyl hydroxamate, potassium hexylphenyl hydroxamate, and the corresponding salts of sodium and other alkali or alkaline earth metals. The salts can be converted to the corresponding acids by methods known to those skilled in the art. These hydroxamate compounds can be prepared by well-known methods.

In this invention, the fatty acid used has the general formula:

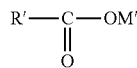

in which R' is an alkyl, aryl or alkylaryl group having 1 to 26 carbon atoms, and M' is hydrogen, an alkali metal or an alkaline earth metal.

Examples of suitable R' groups include methyl, ethyl, butyl, octyl, lauryl, 2-ethylhexyl, oleyl, eicoseyl, phenyl, naphtyl and hexylphenyl.

Examples of suitable alkali metals are lithium, sodium and potassium.

Examples of suitable alkaline earth metals are magnesium, calcium and barium.

The siloxanes used in the present invention are organosilane compounds containing a silicon to carbon bond. Examples of suitable siloxanes include hexamethyldisiloxane, hexamethyltrisiloxane, disiloxane, vinylheptamethyltrisiloxane, octamethyltrisiloxane, tetramethyldisiloxane, and tetravinyldimethyldisiloxane.

The silicones used in the present invention have the general formula:

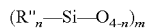

in which R" is vinyl, hydrogen or an alkyl, aryl, or alkylaryl group having 1-26 carbon atoms, n is between 0 to 3 and m is 2 or larger.

Examples of suitable R" include methyl, ethyl, butyl, octyl, lauryl, 2-ethylhexyl, oleyl, eicoseyl, phenyl, naphtyl, hexylphenyl, vinyl and hydrogen.

Examples of silicones which are useful in the process of the invention include polydimethylsiloxanes, polymethylhydrosiloxanes, polyethylhydrosiloxanes and polymethylalkylsiloxanes.

The hydrophobic kaolin-based particles are then blended with a deinking surfactant to produce the hydrophobic kaolin-based deinking composition of this invention. The deinking surfactants used in this invention are well-known in the industry and include ionic, non-ionic and cationic surfactants. Examples of suitable surfactants are fatty acids, fatty acid ethoxylate, fatty alcohol ethoxylate, and ethylene oxide-propylene oxide copolymers.

The present invention is further illustrated by the following examples which are illustrative of certain embodiments designed to teach those of ordinary skill in this art how to practice this invention and to represent the best mode contemplated for carrying out this invention.

EXAMPLE 1

A sample of kaolin clay from Washington County, Georgia was hydrophobized, and the hydrophobic kaolin-based material is then separated from the non-hydrophobic kaolin-based material using the following procedure.

2000 dry grams of a crude kaolin clay sample were blunged using a high speed mixer. Blunging of the clay was conducted at 60% solids using 2.4 pounds sodium silicate per ton of dry clay and 1.6 pounds sodium hydroxide per ton of dry clay. The dispersed kaolin clay was then hydrophobized with the following hydrophobizing reagents: 1 pound alkyl hydroxamate per ton of dry clay, 1 pound tall oil per ton of dry clay and 0.5 pound calcium chloride per ton of dry clay as activator for tall oil. The hydrophobic material was diluted to 25% solids with water and then transferred to a Denver D-12 flotation cell. The slurry was then floated to separate the hydrophobic material from the non-hydrophobic material in the kaolin clay. The hydrophobic kaolin-based material was then collected in the froth phase. This material was then dewatered to remove some of the water present in the collected slurry.

The hydrophobic kaolin-based material produced in Example 1 is used as the hydrophobic kaolin-based deinking component, which is then blended with a nonionic surfactant to produce the hydrophobic kaolin-based deinking composition of this invention.

Table 1 shows the differences in the properties of the starting kaolin clay, the non-hydrophobic kaolin-based material, the hydrophobic kaolin-based deinking component and the hydrophobic kaolin-based deinking composition. As shown, the hydrophobic kaolin-based deinking component and the hydrophobic kaolin-based deinking composition are different from the kaolin clay starting material and the non-hydrophobic kaolin-based material in particle size distribution and chemical composition. The hydrophobic kaolin-based deinking component and hydrophobic kaolin-based deinking composition have a coarser particle size distribution with less particles finer than 2 microns compared to the starting kaolin clay and the non-hydrophobic kaolin-based material. The chemical composition of the hydrophobic kaolin-based deinking component and hydrophobic kaolin-based deinking composition as analyzed by X-ray fluorescence have lower amounts of aluminum and silicon oxides but higher amounts of titanium and iron oxides compared to the starting kaolin clay and non-hydrophobized material.

In addition, due to the blunging of the crude kaolin clay in the presence of a dispersant such as sodium silicate and its pH adjusted to about pH 5 to 11 with a pH modifier such as sodium hydroxide, the resulting hydrophobic kaolin-based deinking component and hydrophobic kaolin-based deinking composition are different because the dispersants have modified the surface property of kaolin which now has the dispersant adsorbed on its surface. The crude kaolin clay does not naturally have these adsorbed dispersant chemicals on its surface. In addition, the hydrophobic kaolin-based deinking component and hydrophobic kaolin-based deinking composition contain hydrophobizing reagents such as alkyl hydroxamate on their surfaces (see Table 1). These differences allow the hydrophobic kaolin-based deinking composition to be effective in deinking.

TABLE 1

| Material | Alkyl Hydroxamate Content, ppm | Particle Size Distribution, % Passing | | | | XRF Chemical Analysis | | | | |
| --- | --- | --- | --- | --- | --- | --- | --- | --- | --- | --- |
| | | 2 μm | 1 μm | 0.5 μm | 0.2 μm | $Al_2O_3$ | $SiO_2$ | $TiO_2$ | $Fe_2O_3$ | Si/Al Ratio |
| Kaolin Clay | 0 | 59 | 45 | 29 | 15 | 37.8 | 44.7 | 1.6 | 0.4 | 1 |
| Non-Hydrophobic Kaolin-Based Material | 0 | 61 | 48 | 32 | 14 | 38.8 | 45.6 | 0.3 | 0.3 | 1 |

TABLE 1-continued

| Material | Alkyl Hydroxamate Content, ppm | Particle Size Distribution, % Passing | | | | XRF Chemical Analysis | | | | |
|---|---|---|---|---|---|---|---|---|---|---|
| | | 2 μm | 1 μm | 0.5 μm | 0.2 μm | $Al_2O_3$ | $SiO_2$ | $TiO_2$ | $Fe_2O_3$ | Si/Al Ratio |
| Hydrophobic Kaolin-Based Deinking Component | 63 | 15 | 6 | 4 | — | 28.3 | 31.1 | 26.4 | 0.9 | 0.93 |
| Hydrophobic Kaolin-Based Deinking Composition | 42 | 15 | 6 | 4 | — | 28.3 | 31.1 | 26.4 | 0.9 | 0.93 |

EXAMPLE 2

The flotation deinking test procedure used in this work is as follows:

Various old newsprint (ONP) from local and national circulation newspapers was shredded. 300 gm of ONP was mixed with hot tap water to 5% solids with the following chemicals added: 2 pounds calcium chloride per dry ton of ONP, 2 pounds sodium silicate per dry ton of ONP, and sodium hydroxide to adjust the pH of the slurry to about 9 to 10. The kaolin clay used as the starting material in Example 1 is added here as the deinking aid together with the other chemicals at the rate of 5 pounds of kaolin clay per dry ton of ONP. The sample was pulped for 10 minutes in a Formax Maelstrom Laboratory Pulper. After pulping, the sample was diluted to 1% solids and floated in a Denver cell for five minutes. After flotation, the accepts containing the deinked fiber was collected and its brightness measured. Brightness measurement was conducted by forming the deinked pulp into a pad, oven dried and the GE brightness measured using TAPPI Test Method T-218. The results are given in Table 2.

EXAMPLE 3

The flotation deinking test procedure used in Example 2 was repeated on an ONP blend. In Example 3, 5 pounds of the non-hydrophobic kaolin-based material produced in Example 1 per dry ton of ONP was used instead. The results of the laboratory flotation deinking test are presented in Table 2.

EXAMPLE 4

Another flotation deinking test was conducted using the flotation deinking test procedures used in Example 2. The test used the same ONP blend, but the deinking aid used in Example 4 was 5 pounds of the hydrophobic kaolin-based deinking component produced in Example 1 per dry ton of ONP. Table 2 shows the results of the laboratory flotation deinking test.

EXAMPLE 5

The procedure used for the laboratory flotation deinking test used in Example 2 was repeated using 5 pounds of the hydrophobic kaolin-based deinking composition produced in Example 1 per dry ton of ONP. The results of the deinking test are presented in Table 2.

As shown, the non-hydrophobic kaolin-based material produced from the kaolin clay in Example 1 gave the lowest brightness of the deinked pulp. On the other hand, the hydrophobic kaolin-based deinking component produced in Example 1 resulted in improving the deinking performance compared to the starting kaolin clay and the non-hydrophobic kaolin-based material produced in Example 1. When the hydrophobic kaolin-based deinking component was blended with the nonionic surfactant to produce the hydrophobic kaolin-based deinking composition, the use of this composition resulted in the most improved deinking. The use of this deinking composition as a deinking reagent gives the highest brightness of the deinked pulp product and the most increase in brightness gain (delta brightness).

TABLE 2

| Material Used as Deinking Reagent | Brightness | | |
|---|---|---|---|
| | Feed | Product | Delta |
| Kaolin Clay | 35.6 | 44.3 | +8.8 |
| Non-Hydrophobic Kaolin-Based Material | 33.2 | 39.5 | +6.2 |
| Hydrophobic Kaolin-Based Deinking Component | 35.1 | 45.7 | +10.6 |
| Hydrophobic Kaolin-Based Deinking Composition | 35.6 | 48.7 | +13.1 |

This invention has been described in detail with particular reference to certain embodiments, but variations and modifications can be made without departing from the spirit and scope of the invention as defined in the following claims.

What is claimed is:

1. A composition for deinking waste paper, wherein the composition comprises:
   A. a non-ionic polyalkylene oxide based surfactant and
   B. a hydrophobic kaolin-based deinking component, wherein the composition improves the brightness of deinked waste paper.

2. A composition for improving the brightness of deinked waste paper, wherein the composition is produced by a process which comprises:
   (1) forming a slurry of dispersed kaolin clay particles;
   (2) treating the dispersed kaolin clay particles with a hydrophobizing reagent;
   (3) separating the hydrophobic kaolin-based particles from the non-hydrophobic kaolin-based particles; and
   (4) adding a non-ionic polyalkylene oxide based surfactant to the hydrophobic kaolin-based particles.

* * * * *